Patented Dec. 12, 1922.

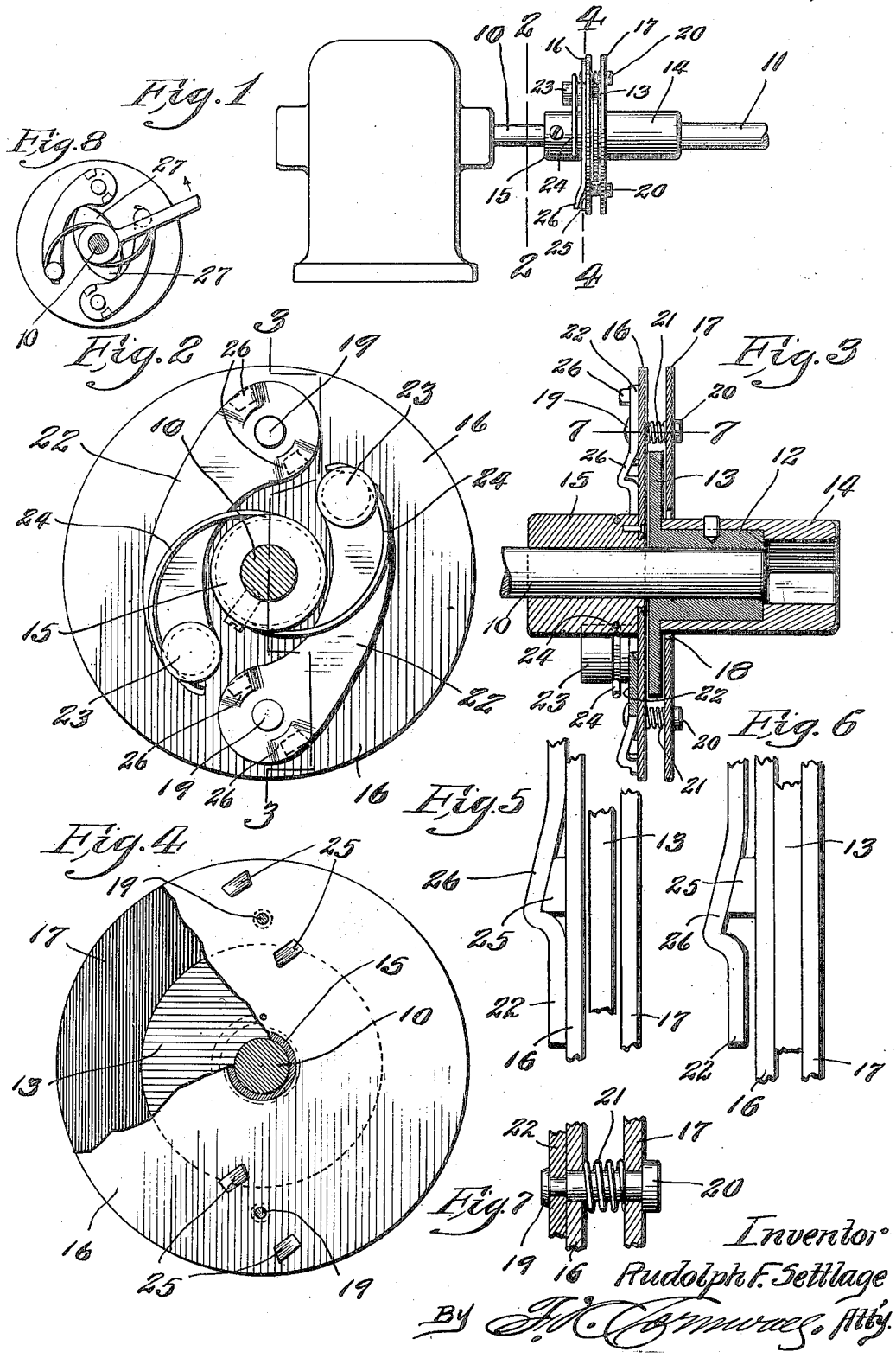

1,438,614

UNITED STATES PATENT OFFICE.

RUDOLPH F. SETTLAGE, OF ST. LOUIS, MISSOURI.

AUTOMATIC FRICTION CLUTCH.

Application filed March 22, 1920. Serial No. 367,796.

*To all whom it may concern:*

Be it known that I, RUDOLPH F. SETTLAGE, a citizen of the United States, residing at St. Louis, Missouri, have invented a certain new and useful Improvement in Automatic Friction Clutches, of which the following is a full, clear, and exact description, such as will enable others skilled in the art to which it appertains to make and use the same, reference being had to the accompanying drawings, forming part of this specification.

My invention relates generally to devices for the transmission of power and motion, and more particularly to a clutch for establishing a driving connection between driving and driven elements such as shafts, the principal object of my invention being to provide a relatively simple and efficient automatically operating friction clutch which, by virtue of its relatively simple construction and positive action, may be advantageously employed in various structures wherein it is desired to employ a self-action driving connection between the shaft of a motor or engine and the driven shaft or rotating machine element.

A further object of my invention is to provide a clutch which will automatically act to release the power or driving shaft in the event that the driven shaft or the machine associated therewith becomes overloaded and there is consequent danger of injury to some part of the driving motor or engine.

With the foregoing and other objects in view, my invention consists in certain novel features of construction and arrangement of parts, hereinafter more fully described and claimed and illustrated in the accompanying drawings, in which—

Figure 1 is an elevational view of a motor and showing my improved clutch arranged between the shaft of the motor and the shaft that is to be driven.

Figure 2 is an enlarged section taken on the line 2—2 of Figure 1.

Figure 3 is a section taken on the line 3—3 of Figure 2.

Figure 4 is an enlarged section taken approximately on the line 4—4 of Figure 1 with parts broken away.

Figure 5 is a detail elevational view of parts of my improved clutch in disengaged positions.

Figure 6 is an elevational view of parts of the clutch and showing the same in engaged positions.

Figure 7 is an enlarged cross section taken approximately on the line 7—7 of Figure 3.

Figure 8 is an elevational view of a modified form of the clutch.

Referring by numerals to the accompanying drawings, which illustrate a practical embodiment of my invention, 10 designates the driving shaft of an engine or motor and the shaft 11 that is to be driven from said shaft 10 through my improved clutch is arranged in direct axial alignment with said driving shaft 10. Loosely arranged on the end of the driving shaft 10 is a collar 12, and formed integral with or fixed to the inner end thereof is a disk 13.

Removably secured in any suitable manner to collar 12 is a sleeve 14, the same projecting beyond said collar in order to receive and be connected to the adjacent end of driven shaft 11. Fixed in any suitable manner to driving shaft 10 adjacent to the collar 12 is a collar 15, and formed integral with or fixed to the end thereof that is positioned immediately adjacent to disk 13 is a disk 16 that is substantially larger in diameter than said disk 13. A plate 17 which has substantially the same diameter as disk 16 is disposed adjacent to the outer face of disk 13, said plate 17 being provided with a centrally arranged aperture 18 through which passes sleeve 14.

Passing through suitable apertures in the disk 16 and plate 17 just outside the periphery of disk 13 and at diametrically opposite points are pins 19 the outer ends of which are provided with heads 20 which bear against the outer face of plate 17, and loosely arranged upon these pins between the disk 16 and plate 17 are expansive coil springs 21. Portions of these pins project beyond disk 16 and mounted on these projecting portions in any suitable manner are the outer ends of oppositely disposed arms 22, the inner ends of which are provided with weights 23. These arms occupy positions and operate directly against the outer face of disk 16 and their weighted ends are yieldingly held against outward movement by curved springs 24, the inner ends of which are secured in any suitable manner to collar 15. (See Fig. 2.)

Formed integral with or fixed to the outer face of disk 16 adjacent to each pin 19 is a pair of outwardly projecting lugs 25, the outer faces of which are slightly inclined or beveled. These lugs are positioned beneath the outer ends of the weighted arms 22 and to accommodate and cooperate with said lugs, portions of the outer ends of said arms are pressed or stamped outwardly as designated by 26, and the inner faces of said pressed or stamped portions are inclined or beveled to correspond with the outer faces of said lugs 25. (See Fig. 5.)

While disengaged or not in service, the parts of my improved clutch occupy the positions as illustrated in Figures 1 to 3 inclusive, the arms 22 being held at their inner limit of movement by the springs 24, and the springs 21 acting to separate the disk 16 and plate 17 and retain the same out of contact with disk 13. When driving shaft 10 reaches a certain speed of rotation, centrifugal forces will cause the weighted arms 22 to swing outward away from each other and away from shaft 10 which carries disk 16 to which the weighted arms are pivoted, and as this action takes place, the inclined inner faces of the outwardly bent portions 26 of the arms 22 will bear against the outer faces of lugs 25, and as a result, disk 16 and plate 17 will be drawn toward each other to frictionally engage and clamp intermediate disk 13, and as a result of this frictional engagement, said disk 13, collar 12, and sleeve 14, will be rotated at the same rate of speed as driving shaft 10, and thus shaft 11 that is connected to sleeve 14 will be correspondingly rotated.

As soon as the speed of driving shaft 10 decreases or drops below a predetermined number of revolutions per minute, the springs 24 will act to draw the weighted ends of arms 23 inward, and following this action, springs 21 will act to separate disk 16 and plate 17, thereby disengaging the intermediate disk 13 and consequently releasing the clutch.

In the event that driven shaft 11 or the machine associated therewith is overloaded to such an extent as to retard the speed of rotation transmitted to said shaft through the clutch, the retarding action will be transmitted through the clutch to the driving shaft 10 of the motor or engine, and following this action the centrifugal arms will swing inward toward each other as a result of the reduced speed, thereby opening or disengaging the clutch without working injury to the motor or engine.

My improved clutch may be used in connection with a driving shaft which operates at a slow speed or at a speed that is insufficient to throw the weighted arms 22 outwardly by centrifugal force and where the clutch is so employed, the arms 22 are swung apart by means of a manually operable double eccentric 27, as illustrated in Figure 8, and which eccentric is mounted for rocking movement upon the collar 15 or shaft 10.

A clutch of my improved construction is comparatively simple, is capable of being easily and cheaply produced, is positive and efficient in action, and can be advantageously employed wherever an automatic clutch connection is desired between driving and driven shafts.

It will be readily understood that minor changes in the size, form and construction of the various parts of my improved clutch can be made and substituted for those herein shown and described, without departing from the spirit of my invention, the scope of which is set forth in the appended claims.

I claim:

1. In a centrifugal clutch, a driving disk, a plate parallel with said disk and slidably mounted to and from the latter, an arm pivoted at one end on said disk and movable axially of its pivot to and from said disk, means on said disk and arm whereby pivotal movement of the latter will cam said arm from said disk, a connection between said arm and plate, and a driven collar positioned between said disk and plate.

2. In a centrifugal clutch, a driving disk, pins supported by and transversely slidable in said disk, a plate carried by said pins and spaced from said disk, a driven collar having a flange between said disk and plate, arms pivotally mounted, at one end of each, on said disk by said pins, weights carried by the other end of each of said arms, cam faces on said arms, projections on said disk adapted to cooperate with said cam faces on said arms when the latter are moved pivotally to move said arms axially so as to withdraw said pins and move said plate to grip said flange collar between said plate and disk.

3. In a clutch, a driving disk, a pin slidable in said disk, an arm pivotally supported by said pin between one end of the pin and one side of said disk, a plate carried by said pin between the opposite side of said disk and the other end of said pin, a driven collar having a flange between said disk and plate, said arm having near its pivotal end a surface inclined to said disk, projections on said disk adapted to be engaged by said inclined surface so that when said arm is moved pivotally, it will draw said pin through said disk and pull said plate toward the latter to clamp said flange between them, and means for pivotally moving said arm.

4. In a clutch, a driving disk, a pin slidable in said disk, an arm pivotally supported by said pin between one end of the pin and one side of said disk, a plate carried by said pin between the opposite side of said disk and the other end of said pin, a driven collar having a flange between said disk and plate, said arm having near its pivotal end a surface inclined to said disk, projections on said disk adapted to be engaged by said inclined surface so that when said arm is moved pivotally, it will draw said pin through said disk and pull said plate toward the latter to clamp said flange between them, and centrifugal means operated by rotation of said disk for pivotally moving said arm.

In testimony whereof I hereunto affix my signature this 18th day of March, 1920.

RUDOLPH F. SETTLAGE.